US012743840B2

(12) United States Patent
Iuliano et al.

(10) Patent No.: US 12,743,840 B2
(45) Date of Patent: Sep. 22, 2026

(54) PATH TRACKING FOR HARDWARE-ACCELERATED RAY TRANSFORMS

(71) Applicant: Apple Inc., Cupertino, CA (US)

(72) Inventors: Luca O. Iuliano, Milton Keynes (GB); Ali Rabbani Rankouhi, Bushey (GB); David J. Bermingham, Cambridge (GB)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 18/670,948

(22) Filed: May 22, 2024

(65) Prior Publication Data

US 2025/0363715 A1 Nov. 27, 2025

(51) Int. Cl.
*G06T 15/06* (2011.01)
*G06T 17/00* (2006.01)

(52) U.S. Cl.
CPC ............ *G06T 15/06* (2013.01); *G06T 17/005* (2013.01)

(58) Field of Classification Search
CPC .............................. G06T 15/06; G06T 17/005
See application file for complete search history.

(56) References Cited

U.S. PATENT DOCUMENTS 11,380,041 B2 7/2022 Muthler et al.
11,676,327 B2 6/2023 Burns et al.
11,776,198 B1 10/2023 Blackmon et al.
2022/0392145 A1 12/2022 Bruce et al.

(Continued)

FOREIGN PATENT DOCUMENTS

CN 113379731 A 9/2021
CN 115222868 A 10/2022

(Continued)

OTHER PUBLICATIONS

Alexander Reshetov, Alexei Soupikov, and Jim Hurley. 2005. Multi-level ray tracing algorithm. ACM Trans. Graph. 24, 3 (Jul. 2005), 1176-1185. https://doi.org/10.1145/1073204.1073329 (Year: 2005).*

(Continued)

*Primary Examiner* — Michelle L Sams
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to ray tracing, particularly for path tracking through a bounding volume hierarchy, according to some embodiments. In some embodiments, ray intersection accelerator circuitry traverses a bounding volume hierarchy that includes transform nodes at multiple levels. Ray transform accelerator circuitry may transform ray information based on reaching a given transform node during the traversal. Path tracking hardware may determine a list of pointers to transform nodes in a traversal path taken to reach a first primitive. This may include utilizing at least two buffer circuits to store pointers for a candidate list and a committed list, storing candidate trail information that indicates, for a given position in the candidate list, which buffer stores a corresponding pointer, and storing committed trail information that indicates, for a given position in the committed list, which buffer stores a corresponding pointer.

20 Claims, 9 Drawing Sheets

(56) References Cited

U.S. PATENT DOCUMENTS

| | | | |
|---|---|---|---|
| 2023/0206539 | A1 | 6/2023 | Tsakok et al. |
| 2023/0252717 | A1 | 8/2023 | Mcallister et al. |
| 2023/0298127 | A1 | 9/2023 | Barczak et al. |
| 2023/0298254 | A1 | 9/2023 | Benthin et al. |
| 2023/0334770 | A1 | 10/2023 | Davison |

FOREIGN PATENT DOCUMENTS

| | | | |
|---|---|---|---|
| CN | 116672706 | A | 9/2023 |
| CN | 116824021 | A | 9/2023 |

OTHER PUBLICATIONS

Samuli Laine. 2010. Restart trail for stackless BVH traversal. In Proceedings of the Conference on High Performance Graphics (HPG '10). Eurographics Association, Goslar, DEU, 107-111. (Year: 2010).*

Saed et al., "Vulkan-Sim: A GPU Architecture Simulator for Ray Tracing," 2022 55th IEEE/ACM International Symposium on Microarchitecture (MICRO), Chicago, IL, USA, 2022, pp. 263-281.

* cited by examiner

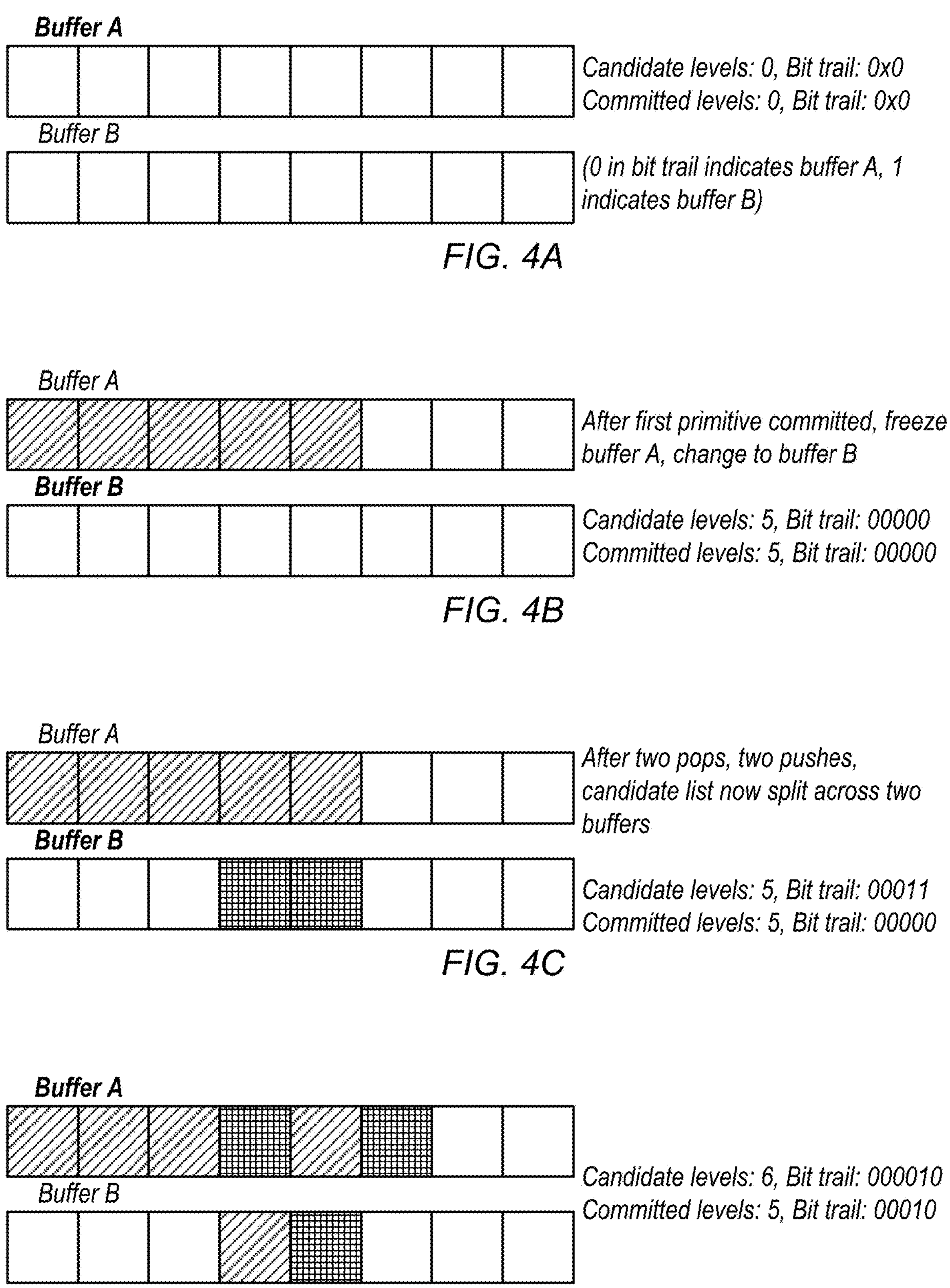
Buffer A
Candidate levels: 0, Bit trail: 0x0
Committed levels: 0, Bit trail: 0x0
Buffer B
(0 in bit trail indicates buffer A, 1 indicates buffer B)
FIG. 4A
Buffer A
After first primitive committed, freeze buffer A, change to buffer B
Buffer B
Candidate levels: 5, Bit trail: 00000
Committed levels: 5, Bit trail: 00000
FIG. 4B
Buffer A
After two pops, two pushes, candidate list now split across two buffers
Buffer B
Candidate levels: 5, Bit trail: 00011
Committed levels: 5, Bit trail: 00000
FIG. 4C
Buffer A
Buffer B
Candidate levels: 6, Bit trail: 000010
Committed levels: 5, Bit trail: 00010
FIG. 4D

PATH TRACKING FOR HARDWARE-ACCELERATED RAY TRANSFORMS

BACKGROUND

Technical Field

This disclosure relates generally to graphics processors and more particularly to ray tracing and instancing.

Description of Related Art

Ray tracing typically involves traversing a bounding volume hierarchy (BVH) acceleration data structure (ADS) for a given ray to determine a set of primitives to test for intersection with the ray. Primitives intersected by the ray may be shaded based on the intersection (e.g., to simulate the impact of light interacting with the surface of an object represented by the primitive)

Graphics processor also may use instancing to store certain attributes of an object (e.g., a house, tree, pavement brick, etc.) once, although the object may be replicated multiple times in the scene. In the ray tracing context, instance nodes in the ADS may indicate to transform ray coordinates to a child coordinate space before continuing traversal. For example, an instanced object may be included as a single sub-tree in the BVH, but the ray coordinate transform may allow computations for multiple different instances of the object in the scene.

In software implementations of ray transforms, software may track the path of instance nodes traversed by a given ray (e.g., a buffer of pointers to the traversed instances) and may commit the path when a primitive intersection is detected for that ray. Particularly for implementations with multi-level instancing, the same primitive may be reached through different paths through the BVH. Because a given ray may intersect multiple primitives, multiple committed trails may be generated for a given ray.

In the context of hardware-accelerated ray transforms, copying the existing path to a new location after each detection of a ray/primitive intersection may be inefficient. But, care should be taken not to overwrite a previous committed path.

BRIEF DESCRIPTION OF DRAWINGS

FIGS. 4A-4D are diagrams illustrating example buffer states for multi-buffer path tracking for candidate and committed lists at different traversal stages, according to some embodiments.

DETAILED DESCRIPTION

In disclosed embodiments, ray acceleration hardware implements at least two buffers in memory to store pointers for a traversal path. The hardware also may store candidate trail information and committed trail information (e.g., a bit trail that indicates which buffer is used for each entry in a given trail and a number of instance levels for a given trail). As one specific example, for the first instance level of a candidate trail, a bit trail value of 0 may indicate a first buffer and a bit trail value of 1 may indicate a second buffer. The trail information may advantageously be utilized to reconstruct a traversal path from the buffers, without a memory copy operation. These techniques may reduce power consumption, improve performance, or both for ray tracing workloads.

On a commit, the ray acceleration hardware may provide buffer locations, committed level information, and the committed bit trail to software, which may use this information to stitch the proper path from the multiple buffers. In this manner, the next candidate list may continue to be formed and a limited number of buffers (e.g., two) are needed, even though the ray may traverse a much large number of paths through a bounding volume hierarchy.

Graphics Processing Overview

Figure 1A:
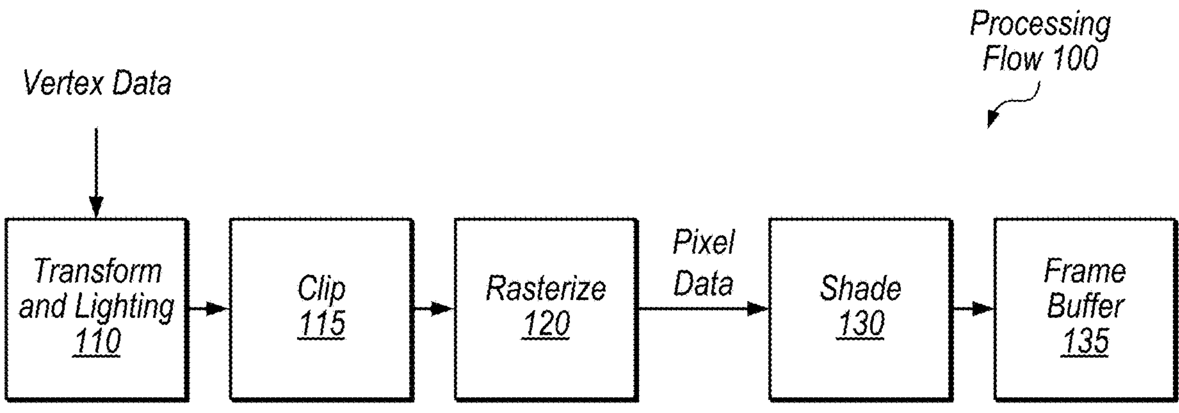
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
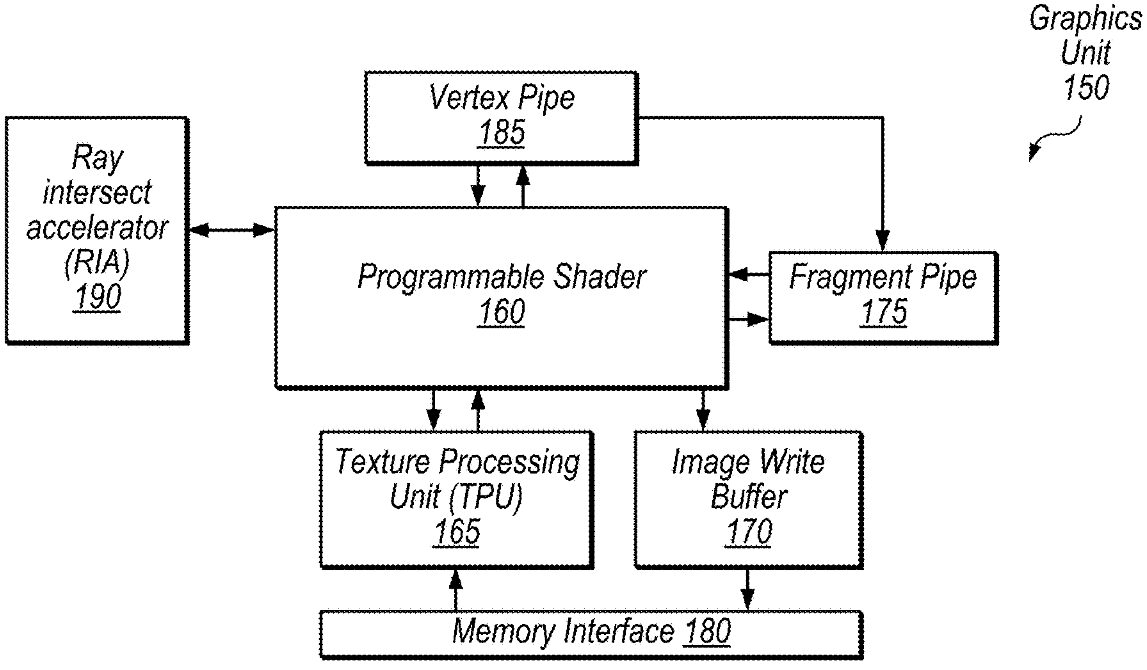
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersect accelerator (RIA) 190, which may include hardware configured to perform various ray intersect operations (e.g., for traversal of a bounding volume hierarchy acceleration data structure) in response to instruction(s) executed by programmable shader 160, as described in detail below.

Overview of BVH Traversal, Multi-Level Instancing, and Hardware Transforms

Figure 2:
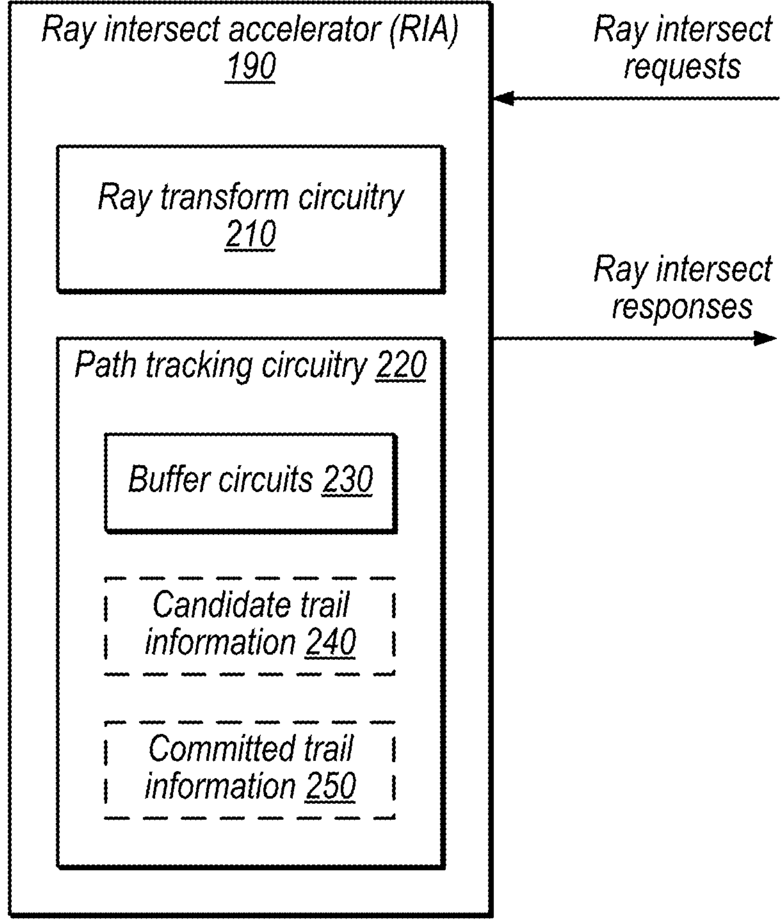
FIG. 2 is a block diagram illustrating example ray accelerator circuitry that includes path tracking circuitry, according to some embodiments.

FIG. 2 is a block diagram illustrating example ray accelerator circuitry that includes path tracking circuitry, according to some embodiments. In the illustrated example, ray intersect accelerator 190 includes ray transform circuitry 210 and path tracking circuitry 220.

Generally, ray tracing involves determining which primitives (e.g., triangles) in a graphics scene are intersected by rays and appropriately shading those primitives. Ray tracing processors typically use an acceleration data structure to narrow down the sets of primitives to test for potential intersection by a given ray. Traversal of this acceleration data structure may use hardware acceleration to perform certain tasks, e.g., testing for intersection with bounding boxes of a bounding volume hierarchy acceleration data structure.

Ray intersect accelerator 190, in some embodiments, is configured to receive ray intersect commands from shader processor 160, traverse a BVH data structure to determine primitive results, and return results to the shader processor 160. In the illustrated example, RIA 190 is also configured to accelerate ray transform operations during the traversal, as discussed in detail below.

In some embodiments, the results generated by RIA 190 include primitive(s) to be tested for primitive/triangle intersection by the shader processor 160. In these embodiments, RIA 190 may implement hardware acceleration for bounding box tests for BVH nodes but not hardware acceleration for triangle tests (or may implement lower-precision triangle filter tests but not full precision tests, e.g., as discussed in U.S. patent application Ser. No. 17/136,542, filed Dec. 29, 2020 and titled "Primitive Testing for Ray Intersection at Multiple Precisions"). In other embodiments, the results returned by RIA 190 for a ray intersect command may include a list of one or primitives determined to be intersected by the ray. In these embodiments, RIA 190 implements acceleration hardware for ray/primitive tests. Note that RIA 190 may receive a ray intersect command for multiple primitives, e.g., specified by different threads of a SIMD group executed by shader processor 160.

Various additional example circuits and techniques that may be implemented by RIA 190 are discussed in U.S. patent application Ser. No. 17/103,433 filed Nov. 24, 2020 and titled "Ray Intersect Circuitry with Parallel Ray Testing."

Ray transform circuitry 210, in some embodiments, is configured to transform ray coordinates from a current coordinate frame to an instance coordinate frame, according to some embodiments. RIA 190 may initiate a transform by ray transform circuitry 210 in response to reaching an instance node in the ADS.

Note that "instancing" is a common graphics technique in which parameters for an object or mesh are defined once and then instantiated multiple times in a graphics scene. Rather than including each instance of the object in the ADS for ray tracing, an instanced object typically may have one "instance sub-tree" in the ADS. On reaching an instance node (the origin of an instance sub-tree), the GPU may transform the ray from world space to an instance space of a specific instance for further traversal. This may substantially reduce the size of the ADS (relative to replicating the sub-tree at different locations in the ADS for different instances), with the tradeoff that the ray transform may utilize processing resources.

The ray transformation may include adjusting the ray's origin X, Y, and Z coordinate values, direction, or both to transform the ray to an instance coordinate space. Ray transform circuitry 210 may include circuitry configured to accelerate transform operations on coordinates of a given ray (e.g., relative to running a shader program to perform the transform operations). A given GPU may implement both hardware and software ray transforms for instancing and may select either a hardware or software transform based on the operating scenario, based on firmware or shader program control, etc.

Path tracking circuitry 220, in the illustrated embodiment, is configured to track candidate and committed paths for ADS traversal by RIA 190. In particular, a given path may include pointers to transform nodes reached during the traversal. The candidate path may be committed once a primitive intersection is detected. In the illustrated example, path tracking circuit 220 includes buffer circuits 230 and is configured to store candidate trail information 240 and committed trail information 250. As discussed in detail below (e.g., with reference to FIGS. 4A-4D), the trail information may include bit trails (which may indicate which buffer stores a pointer at a position in a given path) and level information (which may indicate the number of instance nodes encountered, which corresponds to the number of entries in a given path). Path tracking circuitry 220 may also store an indication of which buffer is currently active (to receive the next entry in the candidate path). Disclosed buffering techniques may reduce or avoid memory copy operations when the candidate path becomes a committed path.

Figure 3:
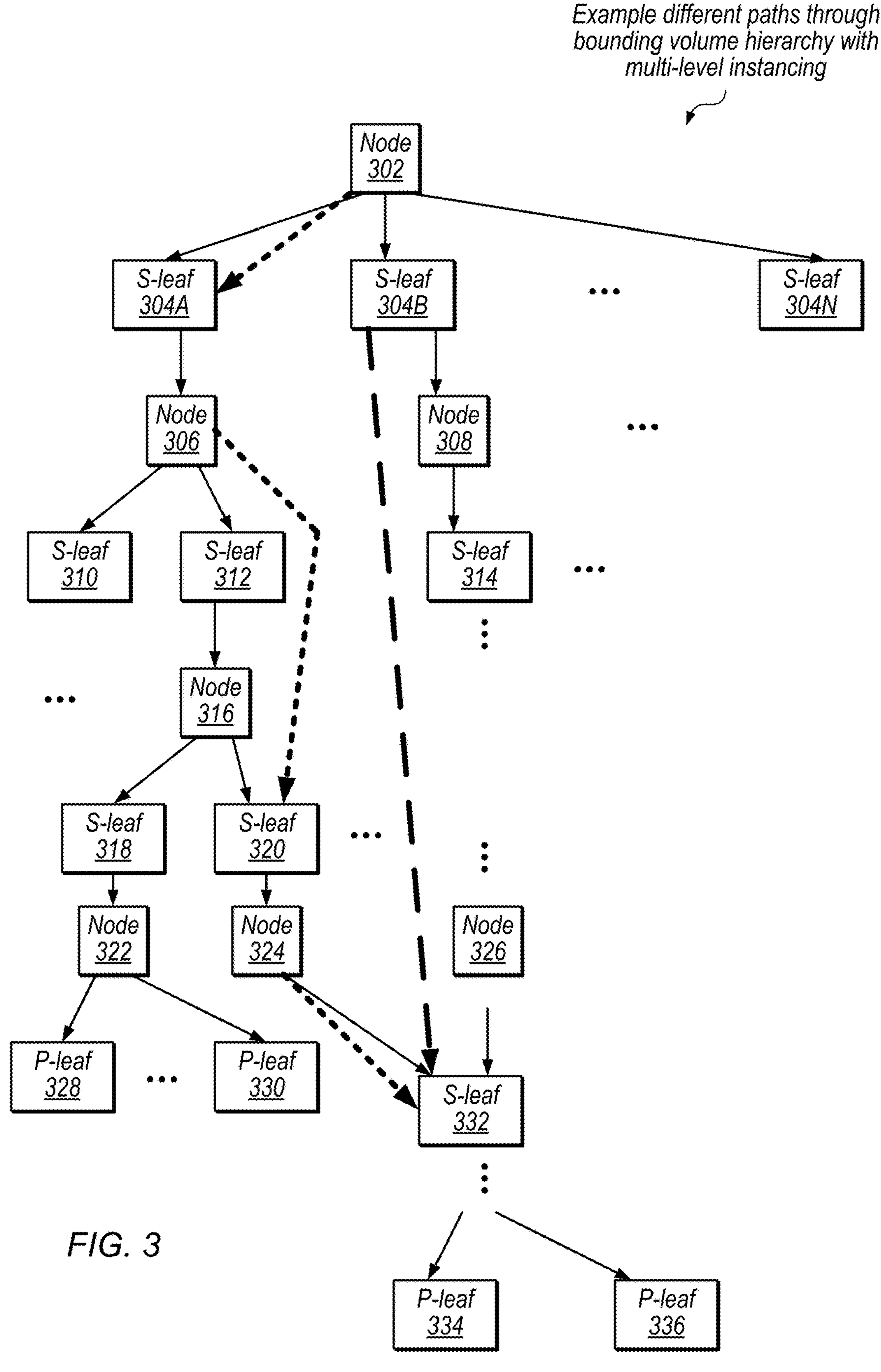
FIG. 3 is a diagram illustrating multiple example paths through a bounding volume hierarchy with multi-level instancing, according to some embodiments.

FIG. 3 is a diagram illustrating multiple example paths through a bounding volume hierarchy with multi-level instancing, according to some embodiments. In the illustrated example, a BVH includes nodes 302-336, which include traditional nodes (e.g., node 302), S-leaf nodes (e.g., node 304A) which are also referred to as transform nodes, and P-leaf nodes (e.g., node 334) which are also referred to as primitive nodes. RIA 190 may evaluate the traditional nodes to determine whether to traverse their descendants during a depth-firth traversal. For example, if there are multiple hits for children of a given node, RIA 190 may proceed past one of the hit nodes and push the other nodes onto a traversal stack for potential later traversal.

The transform nodes may trigger a ray transform by ray transform circuitry 210. The primitive nodes may trigger one or more ray/primitive tests (e.g., ray/triangle tests for triangular primitives). For primitive hits, path tracking circuitry 220 may commit the current candidate path and switch to a different buffer to track the candidate path for further traversal.

The '433 application discusses example node encodings that may be implemented for various illustrated nodes. For example, a node data structure may include bounds 0-N for multiple bounding volumes associated with children of the node, metadata for each bounding volume, an opcode, exponent information, origin information, child base information, status information, and shader index information.

In the illustrated example, two paths through the BVH to S-leaf 332 are highlighted, with a first path shown using bold shorter dashed arrows (through S-leaves 304A, 312, and 320) and a second path shown using a bold longer dashed arrows (through S-leaves 304B and 314). Note that these two paths are highlighted for purposes of discussion, but there may be various additional paths through the BVH that traversal for a given ray could take to primitive node descendants of S-leaf 332.

In this example, a traversal path data structure for the first path would include pointers to at least S-leaves 304A, 312, and 320. Similarly, a traversal path data structure for the second path would include pointers to at least S-leaves 304B and 314. In some embodiments, path tracking circuitry 220 is configured to maintain trail information for various paths through the BVH. For example, the first path may be a committed path (which may be stitched by software or hardware in response to a primitive hit) and the second path may be a current candidate path (which may be committed if there is a hit for a primitive leaf such as 334 or may continue to grow if more instance nodes are encountered). Path tracking circuitry 220 may use buffer circuits 230 and trail information 240 and 250 to track these paths, with example scenarios provided in the following section.

Example Control Information and Buffer States

FIGS. 4A-4D are diagrams illustrating example buffer states for multi-buffer path tracking for candidate and committed lists, at different traversal stages, according to some embodiments. Note that this example is included for purposes of illustration, but various numbers of buffers, sizes of buffers field encodings, etc. may be implemented to track traversal paths in other implementations.

In FIG. 4A, no elements have been added to the candidate list or the committed list, so the candidate and committed levels are both zero and the value of the bit trails is not relevant (indicated as 0x0 as an example initial value). When there are entries in a given path in this example, however, a 0 in the bit trail indicates that the corresponding pointer value is stored in buffer A while a 1 in the bit trail indicates that the corresponding pointer value is stored in buffer B.

In FIG. 4B, an initial primitive hit has been detected for the ray after storing five pointers into buffer A. The candidate list has been committed, so the committed and candidate paths are the same at this point. Updating of buffer A is frozen until the next commit and buffer B is the active buffer (indicated using bold text). Path tracking circuitry 220 may maintain a field (e.g., a bit) to track which buffer is currently active. As shown, both bit trails include zeros for the first five entries to indicate buffer A and the levels value is five for both the candidate and the committed path to indicate five levels of instancing.

In FIG. 4C, two pops and two pushes have occurred during the depth-first traversal. At this point, the committed list remains the same as in FIG. 4B, but the candidate list is now split across two buffers (its first three entries still correspond to the first three entries of the committed list but it has two new entries). This is reflected in the candidate list's bit trail, which indicates that its last two values are in buffer B.

In FIG. 4D, the candidate path now utilizes the first four entries of buffer A, the fifth entry of buffer B, and the sixth entry of buffer B. The committed path uses the first three entries of buffer A, the fourth entry of buffer B, and the fifth entry of buffer A. In this example, buffer A is currently the active buffer.

In some embodiments, the buffers are memory-backed, e.g., according to a unified memory architecture. On a primitive hit, path tracking circuitry 220 may provide the level and bit trail information for use in stitching the committed path (e.g., by accessing the buffer entries based on the level information and the bit trails to access the pointers for the path). For example, in embodiments with software-based primitive tests, software may generate the committed path. In embodiments with hardware accelerated primitive tests, hardware may generate the committed path.

If another primitive hit is encountered before the committed list has been stitched, traversal may pause until the committed list is stitched and the candidate list can then be committed without overwriting the candidate trail information. Note that in embodiments with more than two buffers, each entry in the candidate and committed trails may include multiple bits to identify one of the buffers. Similarly, the state information that indicates the active buffer may include sufficient bits to uniquely identify a buffer. The levels may be encoded using a sufficient number of bits to encode the greatest number of instance levels supported by a given implementation.

Example Detailed Traversal Technique

Figure 5:
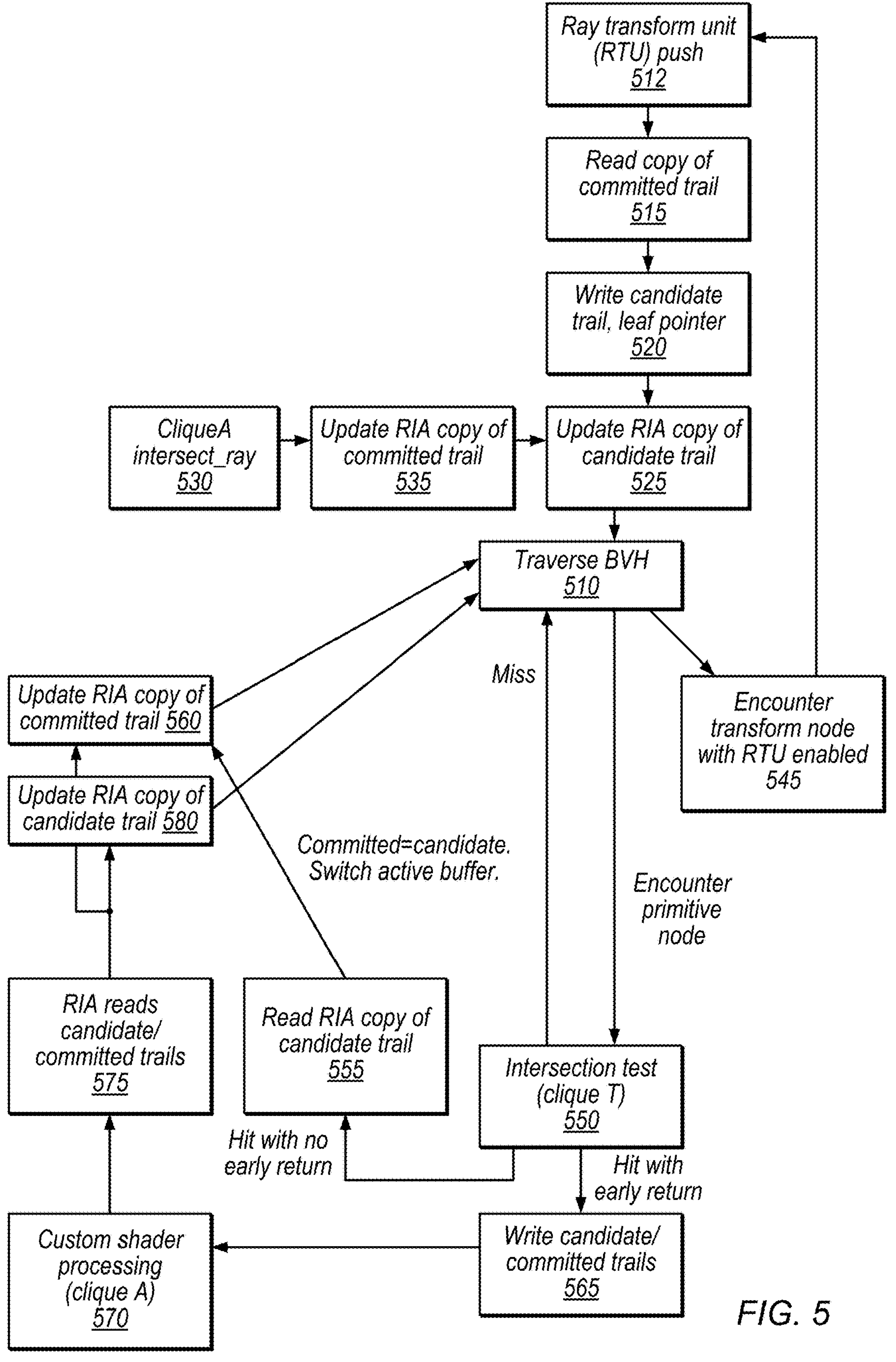
FIG. 5 is a flow diagram illustrating example traversal and path tracking techniques, according to some embodiments.

FIG. 5 is a flow diagram illustrating detailed example traversal and path tracking techniques, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

In some embodiments, most of the illustrated elements are performed by hardware of RIA 190 while the intersection test at 550 is performed by a clique T SIMD group executed by programmable shader 160, the custom shader processing at 570 is performed by a clique A SIMD group executed by programmable shader 160, and the intersect_ray command at 530 is also generated by a clique A. In other embodiments, the illustrated operations may be performed by other circuitry (e.g., RIA 190 may perform the intersection test at 550).

Note that the following terms may be used to describe SIMD groups executed by shader 160: a clique A is a general-purpose (e.g., user specified) shader program, a clique T is a specialized shader that performs a ray/primitive intersection test, and a clique S is a specialized shader that transforms ray coordinates (e.g., when encountering a transform node when hardware traversal by ray transform circuitry 210 is disabled).

At 510, in the illustrated example, RIA 190 traverses the BVH. As shown, flow may arrive at 510 based on an intersect ray command generated by the shader processor 160 at 530 (which may initiate a traversal of the BVH), followed by updating the RIA copy of the committed trail at 535 and the candidate trail at 525. Note that updates to the RIA copies of the committed and candidate trails at 535 and 525 may clear those bit trails to an initial value when entering 510 based on an initial intersect ray command at 530.

During traversal, in response to encountering a transform node when the ray transform unit (RTU) enabled (e.g., acceleration by ray transform circuitry 210) at 545, flow proceeds to 512 and the ray transform unit (RTU) pushes an entry onto a traversal stack based on a transform. At 515, path tracking circuitry 220 reads a copy of the committed trail. At 520, path tracking circuitry 220 writes the candidate trail using the leaf pointer associated with the push and updates the RIA copy of the candidate trail at 525. Once the RIA copy of the candidate trail is up to date, flow proceeds back to 510 and traversal of the BVH continues.

During traversal, in response to encountering a primitive node (e.g., a P-leaf) during the traversal, flow proceeds to 550 and software (a clique T in this example) performs an intersection test. If there is a miss, flow proceeds back to 510 and traversal continues. Note that hardware may perform a lower-precision ray/triangle filter test (not shown) prior to proceeding to 550 and may return to 510 if the filter test misses. Example filter tests are discussed in U.S. patent application Ser. No. 17/136,543 titled "Primitive Testing for Ray Intersection at Multiple Precisions" and filed Dec. 29, 2020.

In response to a hit at 550 with no early return (early return is discussed in detail below), flow proceeds to 555 and path tracking circuitry 220 reads a RIA copy of the candidate trail at 555. Path tracking circuitry 220 then sets the committed path to the current candidate path and switches the active buffer (e.g., from Buffer A to Buffer B in the example of FIG. 4A). Note that the active buffer may be switched in multiple scenarios, e.g., (A) when committing a primitive or (B) when popping out of an instance from the traversal stack that has part of its committed path in the currently active buffer (which the system may determine by examining the committed trail). At 560, path tracking circuitry 220 updates the RIA copy of the committed trail at 560 and flow proceeds back to 510. In this manner, the committed path is tracked without being overwritten by subsequent updates to the candidate path and without a memory copy operation.

Returning to 550, in response to a hit with an "early return," flow proceeds to 565 and path tracking circuitry 220 writes both the candidate and committed trails (e.g., to sideband storage). Note that in some situations, a program may specify a custom hit shader (e.g., a clique A) rather than a default hit shader. The "early return" signal indicates this situation. Therefore, flow proceeds from 565 to custom shader processing by a clique A at 570. Note that the clique A may read or write trails in the sideband storage during execution. Once the custom shader is complete, flow proceeds to 575 and path tracking circuitry 220 reads the candidate and committed trails (e.g., from the sideband storage as discussed above). Flow proceeds to 560 and 580 where path tracking circuitry 220 updates the RIA copy of the committed and candidate trails and flow proceeds back to 510 for further traversal.

Note that in some situations, hardware-accelerated ray transforms may be disabled by hardware or by a program. In these embodiments, when a transform node is encountered at 510, path tracking circuitry 220 may pass an identifier of the active buffer and a ray identifier to a clique S and update the RIA copy of the candidate trail, after receiving results of the shader and before proceeding back to 510 for continued traversal.

Therefore, disclosed techniques may provide path tracking without memory copy operations in various contexts, including hardware ray transforms, software ray transforms, custom hit shaders, etc.

Example Method

Figure 6:
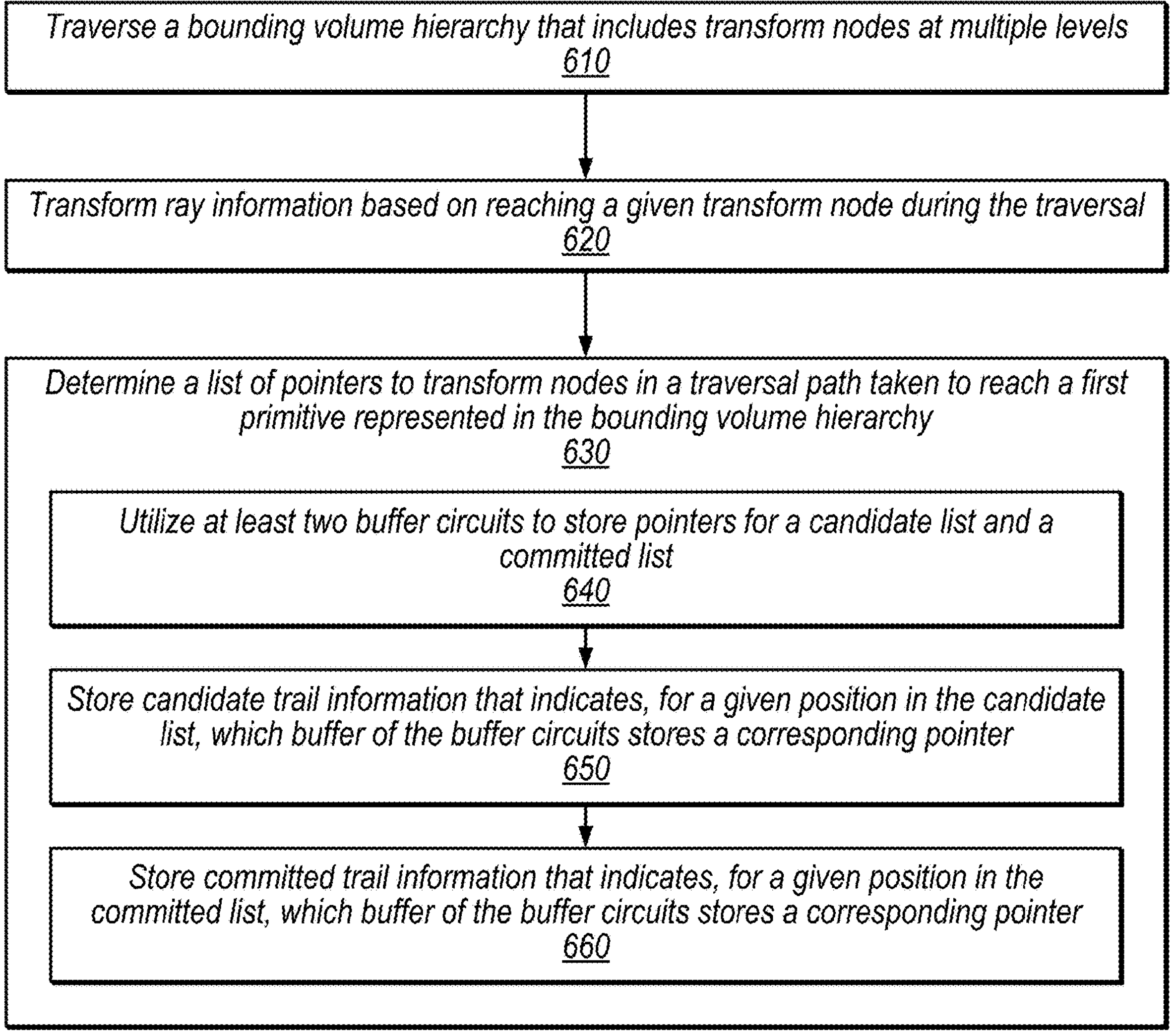
FIG. 6 is a flow diagram illustrating an example method, according to some embodiments.

FIG. 6 is a flow diagram illustrating an example method for tracking traversal paths, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, the graphics processor (e.g., RIA 190) traverses a bounding volume hierarchy that includes transform nodes at multiple levels.

At 620, in the illustrated embodiment, the graphics processor (e.g., ray transform circuitry 210) transforms ray information based on reaching a given transform node during the traversal.

At 630, in the illustrated embodiment, the graphics processor (e.g., path tracking circuitry 220) determines a list of pointers to transform nodes in a traversal path taken to reach a first primitive represented in the bounding volume hierarchy. This includes elements 640-660.

At 640, in the illustrated embodiment, the graphics processor utilizes at least two buffer circuits to store pointers for a candidate list and a committed list.

At 650, in the illustrated embodiment, the graphics processor stores candidate trail information that indicates, for a given position in the candidate list, which buffer of the buffer circuits stores a corresponding pointer.

At 660, in the illustrated embodiment, the graphics processor stores committed trail information that indicates, for a given position in the committed list, which buffer of the buffer circuits stores a corresponding pointer.

In some embodiments, the graphics processor also stores information indicating a number of entries in the candidate list and a number of entries in the committed list (note that these numbers may correspond to the number of instance nodes encountered along a given path). In some embodiments, the graphics processor also stores an indication of which of the buffer circuits is currently an active buffer. The processor may change the active buffer in response to committing the committed list from the buffer circuits (e.g., to ensure that subsequent changes to the candidate buffer do not overwrite the committed buffer until it is accessed).

The graphics processor may include shader processor circuitry configured to execute shader programs and the path tracking circuitry may write the committed trail information to memory accessible to the shader processor circuitry.

Software may then access the pointer information for the path based on the trail information (note that the buffers may be memory-backed such that their contents are software-accessible). For example, the shader program may execute a shader program to stitch the committed list, based on the committed trail information written into memory. In other embodiments (e.g., with hardware-accelerated primitive tests), the path tracking circuitry may stitch the committed list based on the committed trail information.

In some embodiments, for a primitive hit corresponding to a user-specified hit shader program, the processor may write both the candidate trail information and the committed trail information to memory accessible to shader processor circuitry and read candidate trail information and committed trail information generated by the user-specified hit shader program for further traversal of the bounding volume hierarchy.

Example Device

Figure 7:
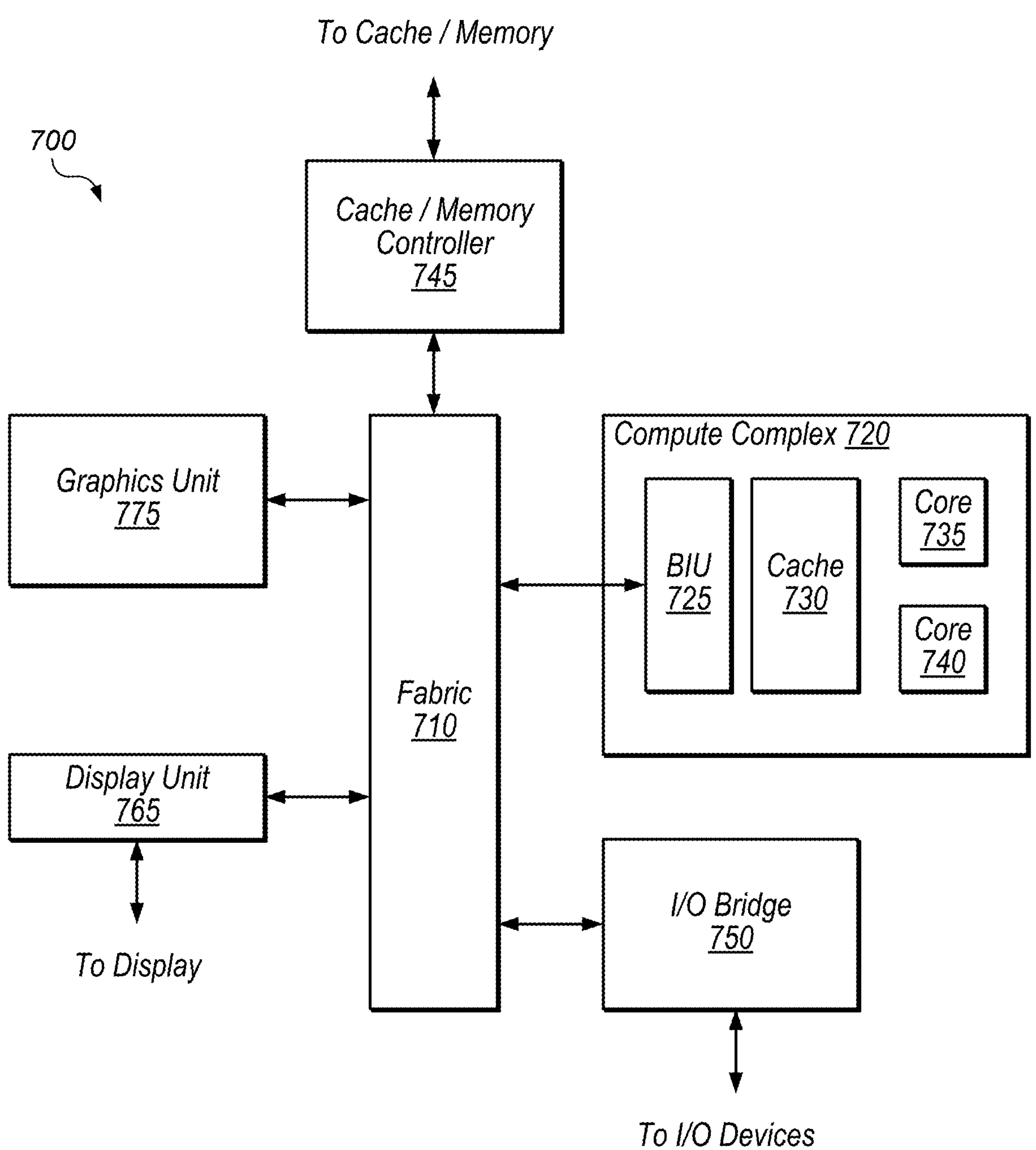
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve performance, reduce power consumption, or both for certain workloads executed by graphics unit 775 (e.g., that heavily utilize ray tracing and multi-level instancing).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
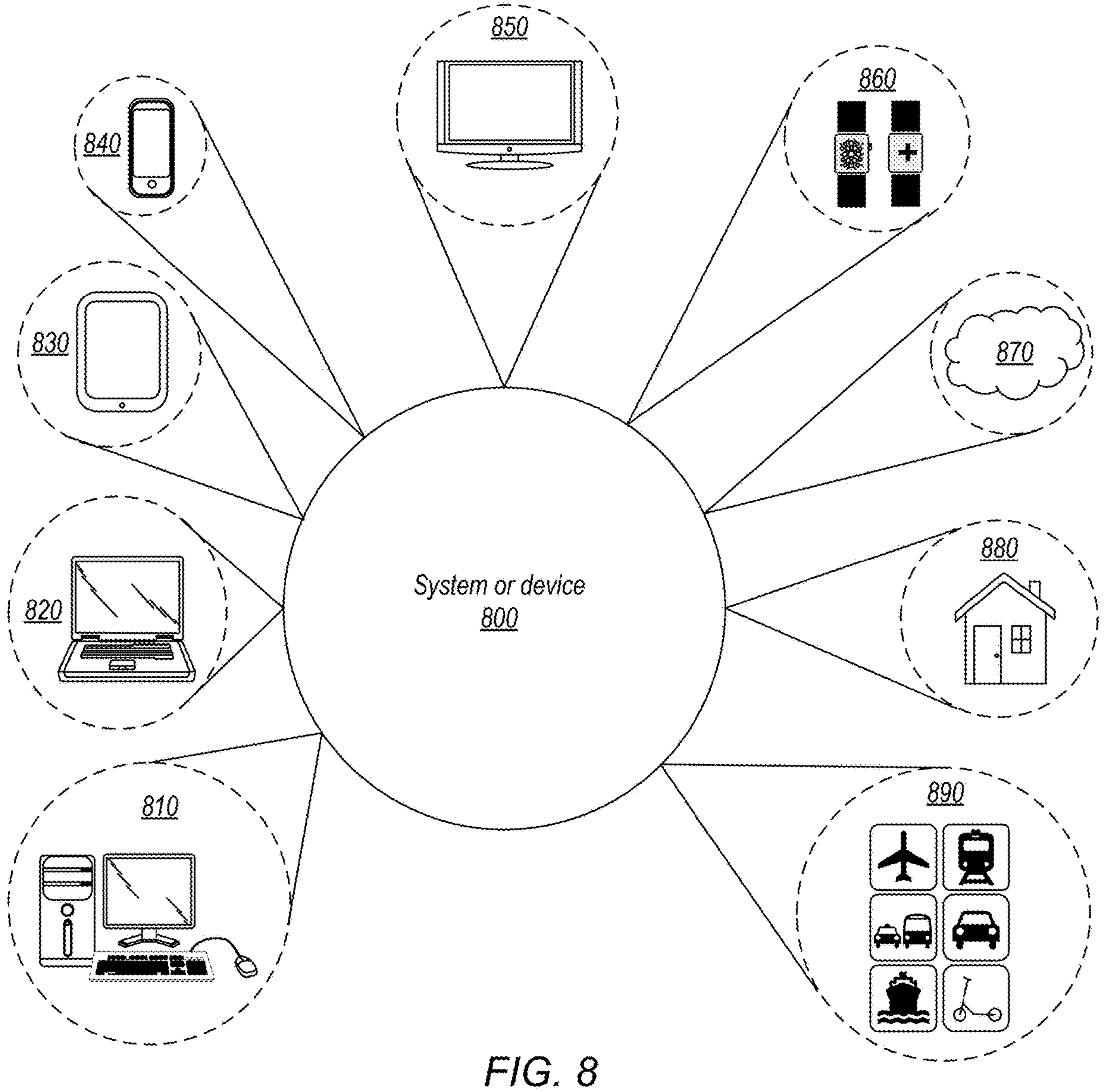
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
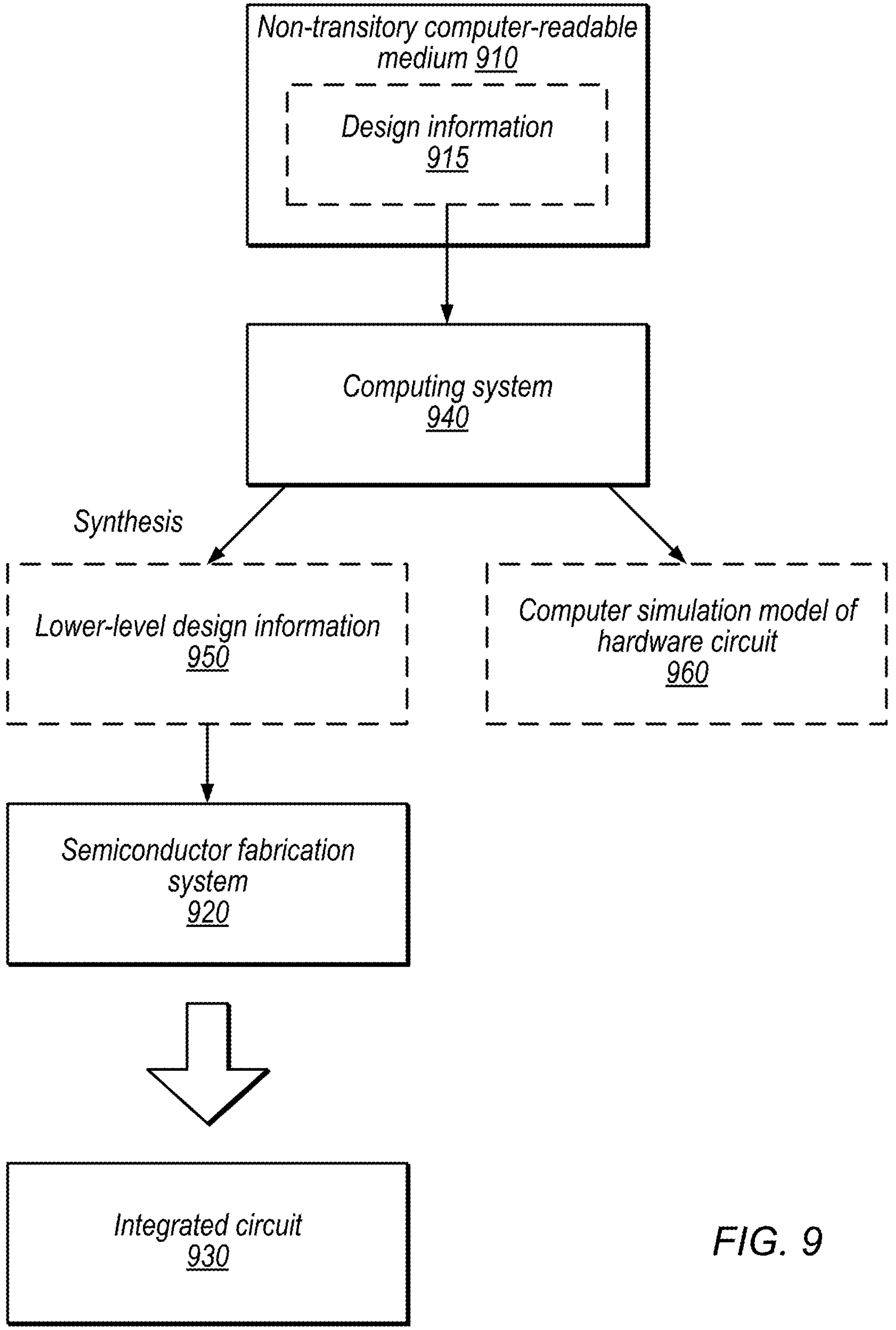
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1B, 2, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

ray intersection accelerator circuitry configured to traverse a bounding volume hierarchy that includes transform nodes at multiple levels;

ray transform accelerator circuitry configured to transform ray information based on reaching a given transform node during the traversal;

path tracking circuitry configured to determine a list of pointers to transform nodes in a traversal path taken to reach a first primitive represented in the bounding volume hierarchy, including to:

utilize at least two buffer circuits to store pointers for a candidate list and a committed list;

store candidate trail information that indicates, for a given position in the candidate list, which buffer of the buffer circuits stores a corresponding pointer; and store committed trail information that indicates, for a given position in the committed list, which buffer of the buffer circuits stores a corresponding pointer.

2. The apparatus of claim 1, wherein the path tracking circuitry is further configured to:

store information indicating a number of entries in the candidate list and a number of entries in the committed list.

3. The apparatus of claim 1, wherein the path tracking circuitry is further configured to:

store an indication of which of the buffer circuits is currently an active buffer.

4. The apparatus of claim 3, wherein the path tracking circuitry is further configured to:

change the active buffer in response to committing the committed list from the buffer circuits.

5. The apparatus of claim 1, further comprising:

shader processor circuitry configured to execute shader programs;

wherein the path tracking circuitry is configured to write the committed trail information to memory accessible to the shader processor circuitry.

6. The apparatus of claim 5, wherein the shader processor circuitry is configured to execute a shader program to stitch the committed list, based on the committed trail information written into memory.

7. The apparatus of claim 1, wherein the path tracking circuitry is configured to stitch the committed list based on the committed trail information.

8. The apparatus of claim 1, wherein the ray intersection accelerator circuitry is configured to:

for a primitive hit corresponding to a user-specified hit shader program, write both the candidate trail information and the committed trail information to memory accessible to shader processor circuitry; and read candidate trail information and committed trail information generated by the user-specified hit shader program for further traversal of the bounding volume hierarchy.

9. The apparatus of claim 1, wherein the apparatus is a computing device that further comprises:

a display;

a central processing unit; and a network interface.

10. A method, comprising:

traversing, by a computing system, a bounding volume hierarchy for a graphics scene that includes transform nodes at multiple levels;

transforming, by the computing system, ray information based on reaching a given transform node during the traversal;

determining, by the computing system, a list of pointers to transform nodes in a traversal path taken to reach a first primitive represented in the bounding volume hierarchy, including:

utilizing at least two buffer circuits to store pointers for a candidate list and a committed list;

storing candidate trail information that indicates, for a given position in the candidate list, which buffer of the buffer circuits stores a corresponding pointer; and storing committed trail information that indicates, for a given position in the committed list, which buffer of the buffer circuits stores a corresponding pointer.

11. The method of claim 10, further comprising:

storing, by the computing system, information indicating a number of entries in the candidate list and a number of entries in the committed list.

12. The method of claim 10, further comprising:

storing, by the computing system, an indication of which of the buffer circuits is currently an active buffer.

13. The method of claim 12, further comprising:

changing, by the computing system, the active buffer in response to committing the committed list from the buffer circuits.

14. The method of claim 10, further comprising:

the computing system writing the committed trail information to memory accessible to a shader processor of the computing system.

15. The method of claim 14, further comprising:

the shader processor executing a shader program to stitch the committed list, based on the committed trail information written into memory.

16. The method of claim 10, further comprising:

stitching the committed list using path tracking circuitry.

17. The method of claim 10, further comprising:

for a primitive hit corresponding to a user-specified hit shader program, the computing system writing both the candidate trail information and the committed trail information to memory accessible to shader processor circuitry; and the computing system reading candidate trail information and committed trail information generated by the user-specified hit shader program for further traversal of the bounding volume hierarchy.

18. A non-transitory computer-readable medium having instructions of a hardware description programming language stored thereon that, when processed by a computing system, program the computing system to generate a computer simulation model, wherein the model represents a hardware circuit that includes:

ray intersection accelerator circuitry configured to traverse a bounding volume hierarchy that includes transform nodes at multiple levels;

ray transform accelerator circuitry configured to transform ray information based on reaching a given transform node during the traversal;

path tracking circuitry configured to determine a list of pointers to transform nodes in a traversal path taken to reach a first primitive represented in the bounding volume hierarchy, including to:

utilize at least two buffer circuits to store pointers for a candidate list and a committed list;

store candidate trail information that indicates, for a given position in the candidate list, which buffer of the buffer circuits stores a corresponding pointer; and store committed trail information that indicates, for a given position in the committed list, which buffer of the buffer circuits stores a corresponding pointer.

19. The non-transitory computer-readable medium of claim 18, wherein the path tracking circuitry is further configured to:

store information indicating a number of entries in the candidate list and a number of entries in the committed list.

20. The non-transitory computer-readable medium of claim 19, wherein the path tracking circuitry is further configured to:

store an indication of which of the buffer circuits is currently an active buffer.

* * * * *